(12) United States Patent
Morozumi et al.

(10) Patent No.: US 6,233,534 B1
(45) Date of Patent: May 15, 2001

(54) MEASURING UNIT, MEASURING DATA MANAGEMENT APPARATUS, MEASURING METHOD AND MEASURING DATA MANAGEMENT METHOD

(75) Inventors: Akio Morozumi; Takeshi Tsukanaka, both of Nagano (JP)

(73) Assignee: T&D Corporation, Nagano (JP)

( * ) Notice: Subject to any disclaimer, the term of this patent is extended or adjusted under 35 U.S.C. 154(b) by 0 days.

(21) Appl. No.: 09/145,257

(22) Filed: Sep. 2, 1998

(30) Foreign Application Priority Data

Sep. 5, 1997 (JP) .................................................... 9-241014

(51) Int. Cl.[7] ............................. G06F 17/40; G01D 9/00; G08C 15/00
(52) U.S. Cl. ............................. 702/176; 702/89; 368/251
(58) Field of Search ................................. 702/173, 79, 89, 702/125, 176, 177; 368/89, 251

(56) References Cited

FOREIGN PATENT DOCUMENTS 0 122 866   10/1984   (EP) .
59-190619   10/1984   (JP) .

Primary Examiner—Kamini Shah
(74) Attorney, Agent, or Firm—Burns, Doane, Swecker & Mathis, L.L.P.

(57) ABSTRACT

A measuring unit capable of measuring change in physical quantity, such as a temperature, and incorporating a measuring portion for sequentially recording plural measurement data measured at a predetermined interval in a memory, and a communication portion capable of transferring the recorded plural measurement data in the memory and the period elapsed from the last data measurement to communication. In the measuring unit, only measurement data can be recorded, requiring no recording of the time information. After transferring the measurement data and the elapsed period to a measuring data management apparatus, the measuring data management apparatus is able to obtain measurement time of each measurement data. Therefore, the structure of the measuring unit can be simplified and the capacity of the memory can effectively be used to record the measurement data. Moreover, time required to transfer measurement data can be shortened. Thus, the resultant measuring unit minimizes electric power consumption and be usable for measurement over en extended period.

10 Claims, 7 Drawing Sheets

MEASURING UNIT, MEASURING DATA MANAGEMENT APPARATUS, MEASURING METHOD AND MEASURING DATA MANAGEMENT METHOD

BACKGROUND OF THE INVENTION

1. Technical Field

The present invention relates to a measuring unit and a measuring method that are capable of measuring a physical quantity, such as temperature or humidity, a measuring data management apparatus and a measuring data management method that are capable of managing the measuring unit.

2. Description of the Related Art

Recently, in a variety of industrial fields including production, sale, physical distribution and inventory control, there has been developed a measuring system incorporating measuring units each having an appropriate sensor to measure a physical quantity, such as temperature, humidity, atmosphere or volume of air, so as to periodically supply results of the measurement to an managing apparatus, such as a personal computer and concentrically monitor the environments of areas.

The measuring system of the foregoing type records the physical quantity that the sensor measures, for example, the temperature, in a predetermined portion together with the date and time of the measurement. Recorded data will be used in a variety of purposes, for example, visualizing the temperature change by a graph, or detecting a cause of the temperature change in accordance with the date and time when the change is found. Therefore, the measuring system is required to obtain and record at least the time of the measurement in addition to the measurement data obtained by measuring the physical quantity such as the temperature.

In order to record the measurement time when data has been measured, a system containing a clock function such as a real time clock (RTC) system is required. In a measurement system having measuring units each disposed at a measuring position and using measurement data stored therein for a predetermined period of time the measuring unit to be disposed each position must be provided with the clock function. However, providing the clock function for each of the measuring units may raise the manufacturing cost excessively. What are worse, the size of the measuring unit will be unavoidably increased and the electric power consumption will be enlarged. When a plurality of measuring units are disposed at the respective measuring positions to measure the respective temperature thereof, each of the clock function provided for the measuring units has to be synchronized with each other at least periodically. As a matter of course, a system of the described above can be constituted. However, this may cause the measuring system to be further expensive and complicated. As the communication between the measuring unit and a central managing unit has to be performed frequently for such synchronization, there arises another problem of increased power consumption. Employing a clock system exhibiting an excellent accuracy and free from excessive variation may lower the frequency of synchronization. However, such a precise clock function will further raise the manufacturing cost. Therefore a measuring system described above cannot become readily available.

If the clock function is omitted from the measuring unit having a function of storing measurement data, the time of the measurement cannot be stored nor be used. In addition, a reservation function with which measurement start time is set and the measurement is automatically started at the set time cannot be provided for the measuring unit, resulting in inconvenient measuring unit for users.

Accordingly, an object of the present invention is to provide a measuring unit and/or a measuring method which are capable of finding the time of the measurement of individual measurement data without using clock function, and to provide a measuring data management apparatus and/or a measuring data management method which are capable of providing the time of the measurement of individual measurement data received from the measuring unit. Another object of the present invention is to provide a measuring unit and/or a measuring method which are capable of automatically starting a measuring operation at a measurement start time without a clock function, and to provide a measuring data management apparatus and/or measuring data management method which are capable of setting the measuring unit as described above.

SUMMARY OF THE INVENTION

A measuring unit according to the present invention includes measuring means capable of sequentially recording plural measurement data measured at a predetermined interval of period of time in recording means; and communication means capable of transferring the plural measurement data recorded in the recording means and transferring period elapsed from last data measurement to communication together with the plural measurement data. A measuring method according to the present invention includes a recording step for sequentially recording plural measurement data measured at a predetermined interval of period; and a communication step for transferring the recorded plural measurement data and period elapsed from last data measurement to communication. The measuring unit and the measuring method according to the present invention enable a receiving side apparatus to obtain the time at which the last measurement data has been measured in accordance with the communication time and the elapsed period. On the other hand, the other measurement data is sampled at predetermined intervals. Therefore, also the time at which the other each measurement data has been measured can be obtained in accordance with the time the last measurement data measured. Therefore, the measuring unit and the measuring method according to the present invention enable to determine the time at which each measurement data has been measured without neither a clock function nor a step for recording the measurement time of each measurement data. Since the measurement time is not required to be stored together with measurement data, the capacity of the recording means can effectively be used.

A measuring data management apparatus (a measurement-data managing apparatus) according to the present invention includes communication means capable of performing communication with the measuring unit and receiving the period elapsed from the last data measurement to communication together with the plural measurement data; time measuring (clock function) means capable of obtaining communication time; and means for obtaining measurement time of each of received measurement data in accordance with the communicated time, the elapsed period and the measurement interval. Thus, using the this measuring data management apparatus, the measurement time of each measurement data measured in the measuring unit or by the measuring method according to the present invention can be obtained. In addition, a measuring data management method (a measurement-data managing method) of this invention includes a receiving step for performing communication with a measuring unit capable of sequentially recording plural measurement data measured at a predetermined interval and receiving the plural measurement data and the period elapsed from the last data measurement to communication; a time measuring step for obtaining communication time; and a step for obtaining measurement time of each of the received measurement data in accordance with the communication time, the period elapsed and the measurement interval. Thus, in this measuring data management method, measured time of each measurement data that are obtained in the receiving step can be determined. Since by the measuring data management apparatus and/or the measuring data management method according to the present invention enable to obtain the time of the measurement data measured by the measuring unit respectively, using these information, a variety of processes can be performed such as displaying and analyzing measurement results.

Employing the measuring unit, the measuring method, the measuring data management apparatus and the measuring data management method of the present invention may remove a clock apparatus for supervising time from the measuring unit. Simply providing measuring means capable of measuring a physical quantity, such as temperatures, at appropriate intervals (interval period of time) in a unit of second or minute and sequentially recording the physical quantities is enough. And it may allow the measuring data management apparatus, to which measurement data are transferred, to identify the measurement time of the individual measurement data. Therefore the present invention requires no recording of the measurement time and yet makes it possible to perform a process identical to the one executed by a system having a measuring unit for recording the measurement time of individual measurement data. Accordingly the structure of the measuring unit of the present invention can be simplified. Since the measuring unit is not required to have time information of individual measurement data, the substantial storage capacity can be significantly enlarged. Therefore, the resultant measuring unit can be compact and yet have a large storage capacity. Since a complicated process for synchronization of time among the measuring units can be omitted, management and maintenance thereof can easily be performed.

When enabling the receiving of a measurement start command containing waiting period elapsing from communication performed by the communication means of the measuring unit until the measurement start time and further employing control means for starting the measurement after the elapse of waiting period upon receipt of the measurement start command, measurement can automatically be started at predetermined measurement start time without clock function. When a plurality of measurement data recorded in the recording means are transferred by the communication means, the measurement start time is transferred to the measuring data management apparatus together with the plural measurement data. Thus, the measuring data management apparatus is able to determine the measurement time of individual measurement data in accordance with the measurement start time received.

In the measuring data management method, when further providing a transmission step for transmitting a measurement start command containing waiting period elapsing from transmission to measurement start at the communication with the measuring unit, it becomes possible to manage the measuring unit having no clock function to automatically start the measurement.

The measuring data management method can be provided as software (application software) which can be executed by an information processing apparatus, such as a personal computer. A measuring data management program having commands which are capable of executing the steps above can be recorded on a recording medium, such as a floppy disk, a hard disk or a CD-ROM, which can be read by an information processing apparatus such as a personal computer is provided. This software (the program) can also be supplied through a computer network, such as the Internet.

BRIEF DESCRIPTION OF THE DRAWINGS

These and other objects of the present invention will be seen by reference to the description, taken in connection with the accompanying drawings, in which.

DESCRIPTION OF THE PREFERRED EMBODIMENT

Figure 1:
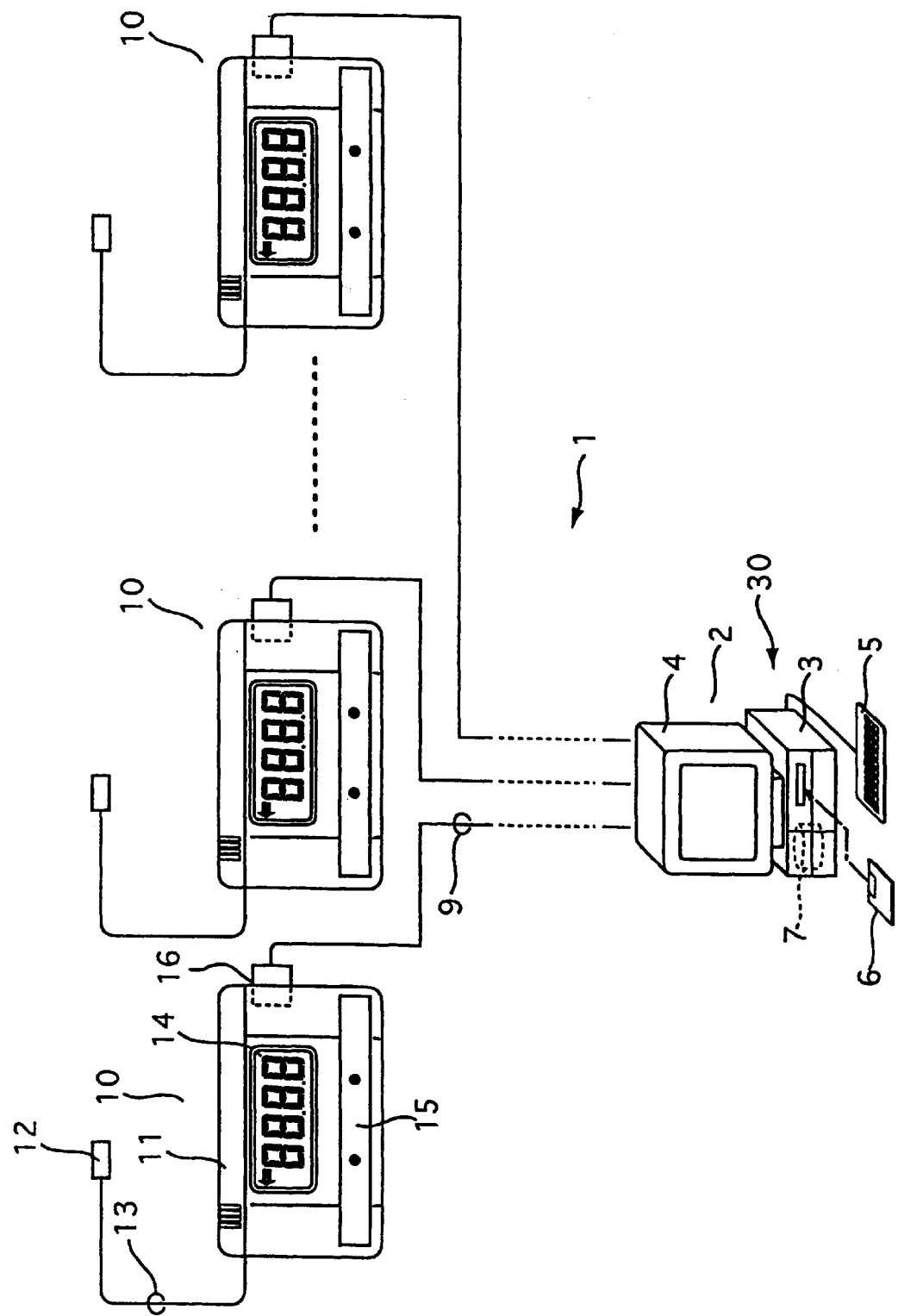
FIG. 1 is a schematic view showing the structure of a temperature measuring system to which the present invention is applied.

Referring to the drawings, an embodiment of the present invention will be described. FIG. 1 shows a schematic structure of a temperature-measuring system 1 according to the present invention. The measuring system of this embodiment incorporates a personal computer 2 which is a main unit serving as a measuring data management apparatus 30. A plurality of measuring units 10 are connected to the personal computer 2 through transmission lines 9. As a matter of course, the plural measuring units 10 may be connected using another method, such as a network method incorporating a bus, in place of using the individual transmission lines 9. The personal computer 2 serving as the measuring data management apparatus (that is herein also referred to as the measurement-data managing apparatus) 30 has a usual structure incorporating a main body 3, a display unit 4, a keyboard 5 and so forth. The main body 3 has a hard disk drive 7 and a floppy disk drive 6 adapted to a removable disk. Thus, the floppy disk drive 6 and the hard disk drive 7 are able to serve as units for storing data and programs.

Each of the measuring units 10 disposed at measuring regions (fields) apart from the personal computer 2 incorporates a main body 11 and a sensor cable 13 having a leading end connected to a temperature sensor 12. The sensor cable 13 is connected to the main body 11 so that surrounding temperature can be measured by the temperature sensor 12 to record. Moreover, the main body 11 is provided with a displaying LCD 14 and a manual operation switch 15. A connector 16 for connecting the transmission lines 9 is provided on the side surfaces of the main body 11 such that communication with the personal computer 2 can be established at an appropriate timing.

Figure 2:
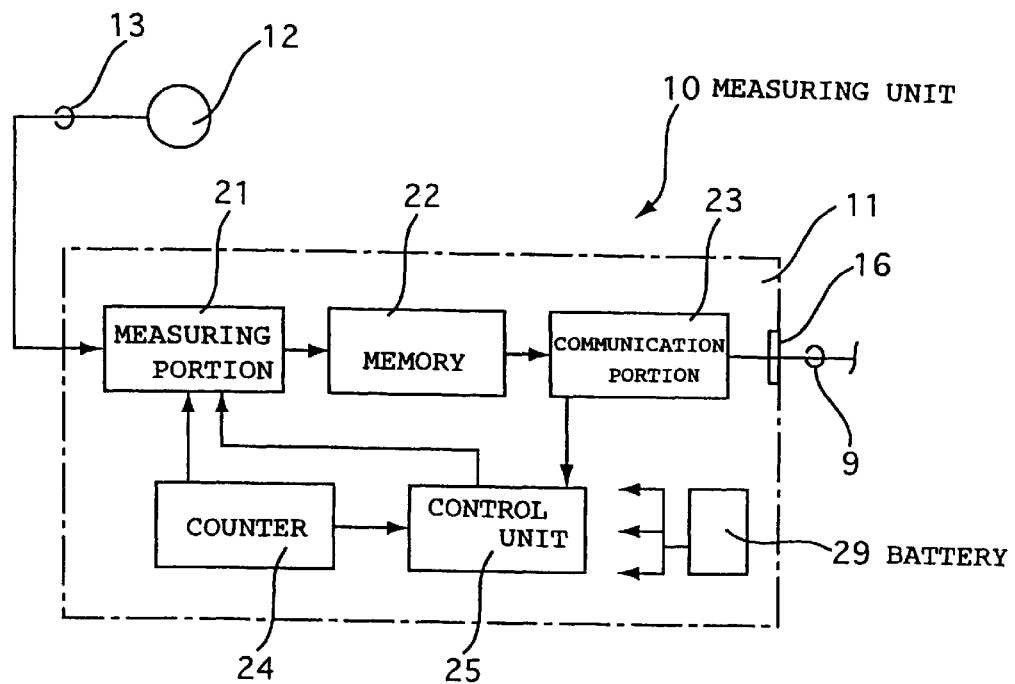
FIG. 2 is a block diagram showing the schematic structure of the measuring unit shown in FIG. 1.

FIG. 2 is a block diagram showing the schematic structure of the measuring unit 10. The measuring unit 10 of this embodiment has a measuring portion 21 which can record temperatures measured by the temperature sensor 12 at predetermined intervals in a memory 22 such as a RAM. Moreover, the measuring unit 10 has a recording portion (a memory) 22 which can sequentially record measured temperature data (measurement data) and can also record other data, for example, set values including a measurement start time and intervals of period, i.e., measuring intervals. In addition, the measuring unit 10 further incorporates a communication portion 23 which transmits the measurement data stored in the memory 22 to the personal computer 2 and which can receive, for example, a measurement start command sent from the personal computer 2. Moreover, the measuring unit 10 of this embodiment has a counter 24 for counting intervals in a unit of second and/or minute. The measuring unit 10 further incorporates a control unit 25 for controlling each of the above-described function portions. The control portion 25 controls all of the operations of the measuring unit 10, for example, the control unit 25 issues an instruction to the measuring portion 21 to measure data in accordance with the count of the counter 24. When a demand of transfer is issued from the personal computer 2, the control unit 25 instructs start of transfer of measurement data stored in the memory 22. Each of the measuring units 10 of this embodiment are independently operated by a battery 29 contained in the main body 11. Thus, the measuring units 10 are required to simply be disposed at the measuring fields to measure and record changes in the temperatures thereof.

The measuring unit 10 of this embodiment is able to receive, through the communication portion 23, a measurement start command containing measurement start time, measurement intervals (period of time) $\tau 0$ and period (a waiting period) $\tau 1$ which elapses from the time when the communication has been performed until the measurement start time. The control unit 25 has a function that counts period elapsed from the receipt of the measurement start command by the counter 24 and starting the measurement after the elapse of the waiting period $\tau 1$. Thus, the measuring unit 10 of this embodiment is able to automatically start measuring at the predetermined measurement start time based on the issued measurement start command.

When transmitting the plural measurement data stored in the memory 22, the measuring unit 10 of this embodiment is able to collectively transmit the measurement start time, the interval $\tau 0$ and elapsed period $\tau 2$ that is the period elapsed from last data measurement to the communication.

Figure 3:
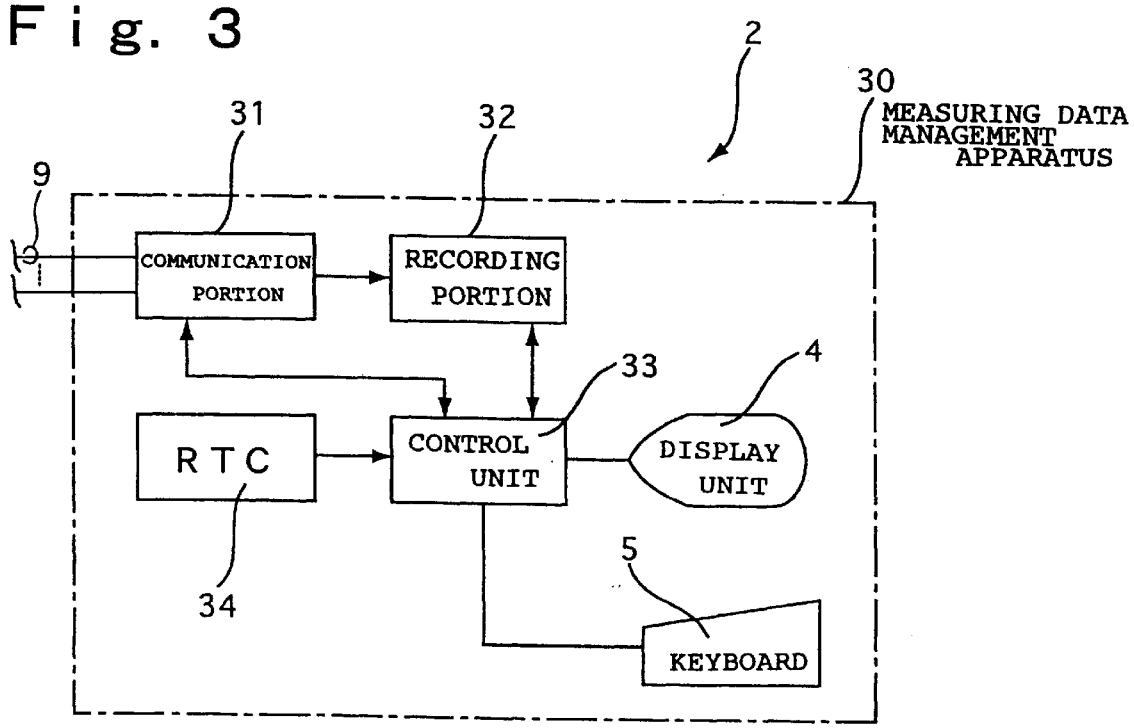
FIG. 3 is a block diagram showing the schematic structure the measuring data management apparatus shown in FIG. 1.

FIG. 3 is a block diagram showing the schematic structure of the measurement-data managing apparatus 30 in the form of the personal computer 2. The measurement-data managing apparatus 30 of this embodiment has a communication portion 31 for performing communication with the measuring units 10, a storage portion 32 which is capable of storing measurement data and so forth supplied from the measuring units 10 and a control portion 33 for controlling the communication portion 31 and the storage portion 32. A display unit 4 and a keyboard 5 are connected to the control unit 33, by which measurement data obtained from the measuring unit 10 can be displayed. Moreover, start of the measurement can be instructed, and received measurement data can be analyzed. The measuring data management apparatus 30 of this embodiment has a real time clock (RTC) 34 for continuously counting date and time. Thus, the time at which the communication has been performed with each measuring unit 10 can accurately be detected.

Figure 4:
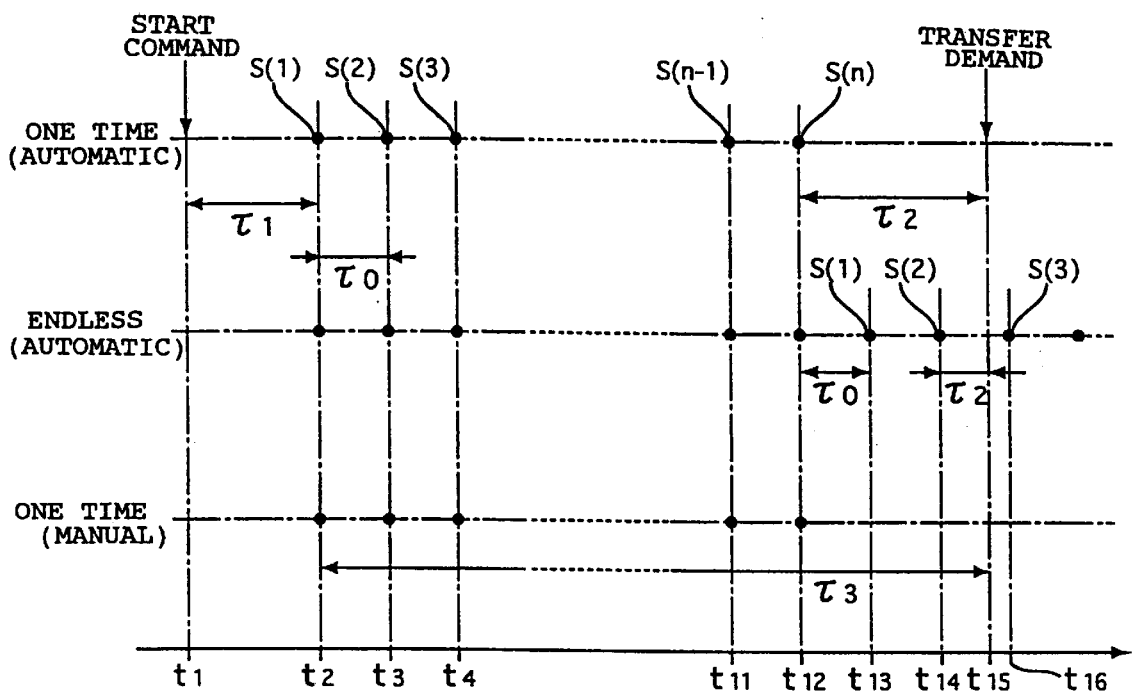
FIG. 4 is a timing chart of an example of a measuring method using the temperature measuring system shown in FIG. 1.

FIG. 4 is a timing chart showing how the measuring unit performs the measurement. Referring to the drawing, two methods will be described, each of which enables the measuring system 1 of this embodiment to automatically measure the temperature. One of the two methods is called "one time" with which temperatures are measured at a predetermined interval $\tau 0$ and obtained measurement data are sequentially recorded in the memory 22. The measurement is repeated until the memory 22 is filled with measurement data, and then the measuring operation is interrupted. With the one time method, when the measuring unit 10 receives a measurement start command from the measurement-data managing apparatus 30 at time t1, a recording operation is started at time t2 elapsed from the time t1 by waiting period $\tau 1$ contained in the measurement start command. Since the waiting period $\tau 1$ represents the period of time elapsing from the communication to the measurement start, start of the measurement after the elapse of the waiting period $\tau 1$ enables the measurement to automatically be started at the measurement start time communicated with the measurement start command. Then, the measurement is repeated at the interval of $\tau 0$ so as to sequentially record measurement data S(i) in the memory 22. When last measurement data S(n) which can be stored in is recorded at time t12, the measuring operation is interrupted. When a transfer demand is received from the measurement-data managing apparatus 30 at time t15, a series measurement data S(1) to S(n) recorded in the memory 22 are transferred to the measurement-data managing apparatus 30. Since the measurement start time t2 and the interval $\tau 0$ are simultaneously transferred, the measurement time of each measurement data S(n) can be derived from calculation performed by the measurement-data managing apparatus 30.

Storage of the measurement start time t2 in the memory 22 may be omitted. In this case, the period $\tau 2$ elapsed from measurement to transfer of the last measurement data S(n) is transmitted together with the measurement data so that the time at which each measurement data obtained is determined in the same manner as an endless method to be described later. The transfer demand may be issued to the measuring unit 10 at arbitrary time before obtaining the last measurement data S(n). In this case, measurement data from the first measurement data to a midpoint measurement data S(i) and the period $\tau 2$ elapsed from measurement of the measurement data S(i) just before transmission of the transfer demand to the communication are transmitted. Then, the measurement is continued until the capacity of the memory 22 is filled with measurement data.

Another method is called the "endless" method. In the endless method, each temperature is measured at a predetermined interval $\tau 0$ and measurement data are sequentially recorded in the memory 22. With the endless method, in order to continue the measurement and recording operations, the first recorded measurement data will be overwritten by the newly entered measurement data when the memory 22 is mostly filled. That is, in the endless mode, measurement is continuously performed at the set interval $\tau 0$ from time t2 to record data. When the nth measurement data S(n), which is the last data to be able to store in, is recorded in the memory 22 at time t12, the measurement data obtained at time t13 as the next sampling timing is recorded as the first measurement data S (1).

In the endless mode, the measurement is continuously repeated so that newly measured n measurement data are recorded in the memory 22 as described above. When the transfer demand is issued from the measurement-data managing apparatus 30 at a certain time, in the case as shown in FIG. 4, the plural measurement data recorded in the memory 22 and information of the elapsed period τ2 from time t14 at which the measurement data S (2) has been measured to time t15 at which the communication has been performed are transferred to the measurement-data managing apparatus 30. The measurement-data managing apparatus 30 is able to accurately detect the time t15 as the transfer time. Thus, the measurement-data managing apparatus 30 is able to detect the time at which each measurement data item has been obtained in accordance with the elapsed period τ2 and the interval τ0 respectively. In the endless mode, after stored data has been transferred, next measurement is continuously started at time t16 from the time t14 at which measurement data S (2) has been measured and elapsed the predetermined interval so that obtained data is continuously recorded in the memory 22. When a next transfer demand is received from the measurement-data managing apparatus 30 at an appropriate timing, measurement data stored until that time and the elapsed period τ2 are transmitted. Therefore, when the managing program is executed with which a transfer demand is issued before overwriting non-transferred data stored in the memory 22, the measurement-data managing apparatus 30 is able to obtain sequential measurement data without missing any data. Thus, measurement data of the environmental condition, such as temperatures, can continuously be managed.

As described above, the measuring unit 10 of this embodiment does not record the time at which the data items have been measured but data of temperatures only during recording operation. Therefore, the capacity of the memory 22 can be used for almost only storing measurement data. Thus, a large amount of measurement data can be stored in a small-sized memory. Also when transferring data from the measuring unit 10 to the measurement-data managing apparatus 30, only data of the measured temperatures sequentially stored in the memory 22 and the elapsed period τ2 are required to be transmitted. As a result, communication time required to transfer data can be shortened, thus minimizing consumption of the battery 29.

When each measuring unit 10 also transmits the instructed measurement start time or the interval τ0 during transfer of measurement data to the measurement-data managing apparatus 30, the measuring condition for each of the measuring units 10 can be obtained. Hence, the measurement-data managing apparatus 30 is not required to store the above-mentioned items for each measuring unit 10. Therefore, the measuring units 10 and measurement data can easily be managed. Meanwhile in the case where the measurement-data managing apparatus 30 manages the above-mentioned information, it is important to obtain the measurement start time and the interval τ0 together with measurement data to improve reliability of the information by confirming the consistency with respect to the measuring unit 10.

In addition, it is possible to start the measuring operation of the measuring unit 10 manually. When performing the manual measurement, total amount of measurement data is generally not so large and the period of time from start of the measurement (the start time t2) to the transfer time t15 is not considerably long. When the measuring period is short like described above (this applies to the case of automatic measurement), measured period τ3 counted from the measurement start time t2 to the transfer time t15 can be transferred to the host computer at the measurement data transfer. In accordance with the measured period τ3, the measurement-data managing apparatus 30 is able to calculate the measuring time of each data. The measuring time of each data can also be obtained using the period τ2 elapsed from last data measurement.

The time at which measurement data are transferred is shared by the measuring unit and the host computer (the measurement-data managing apparatus) as a common timing. The period elapsed from measurement of the specific data that can be commonly identified by the measuring unit and the measuring data management apparatus to measurement data transfer can be counted by the measuring unit so as to be transferred together with the measurement data. The measuring data management apparatus 30 as the host computer is able to calculate the measurement time of each measurement data item using the common time and the transferred elapsed period. Therefore, the measuring unit is not required to measure or record the measurement time of each measurement data. As the specific measurement data, data measured first or last can easily be identified commonly. The period τ2 elapsed from last data measurement is an appropriately short period, thus easy for counting by the counter and minimizing error. Therefore, this elapsed period τ2 may be useful to transfer after measurement has been performed for a long time and then analyze data.

The timing at which the measurement start command is transmitted is also shared by the measuring unit and the measuring data management apparatus as a common timing. Therefore, if the measurement start command contains the waiting period, the measurement unit can automatically start the measurement at a required time by counting the waiting period without using clock function.

Figure 5:
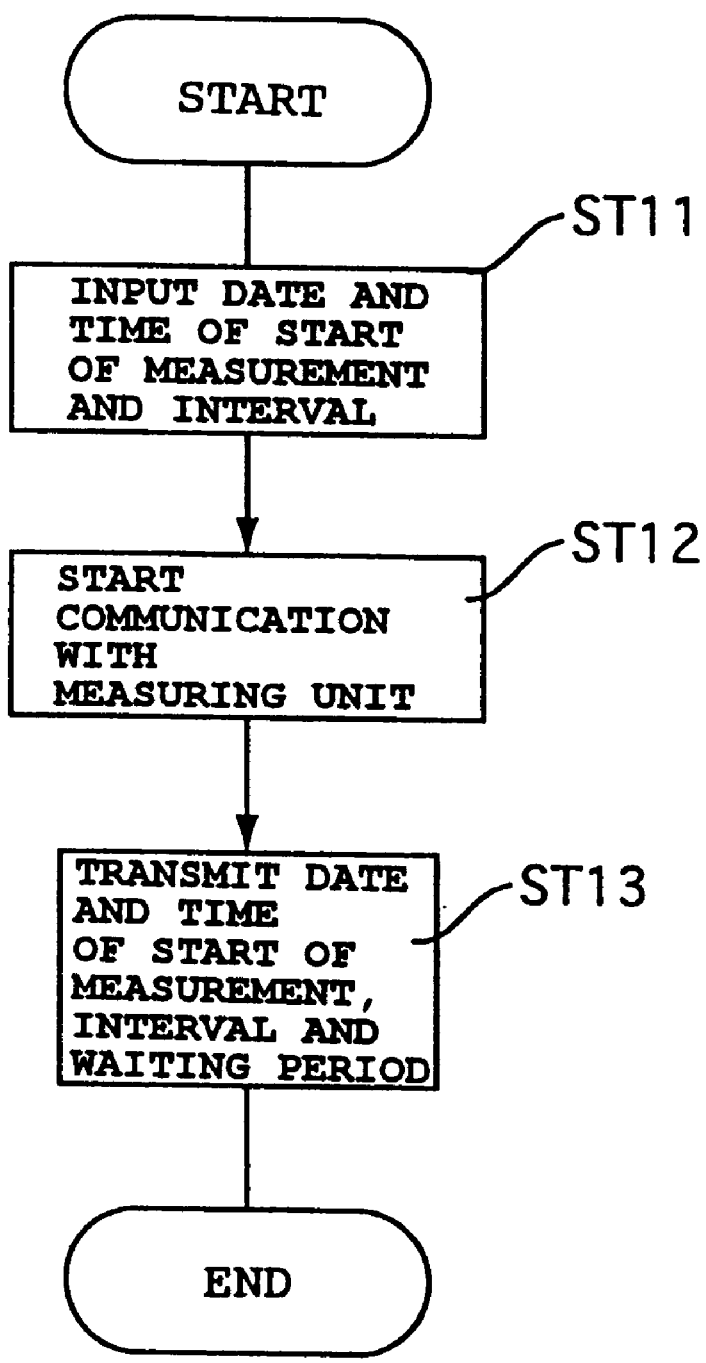
FIG. 5 is a flow chart of a process for automatically starting temperature measurement.

FIGS. 5 to 8 show a schematic flow chart of the processes performed by the measuring unit 10 and the measurement-data managing apparatus 30. FIG. 5 shows a brief process in which the measurement-data managing apparatus 30 reserves the measuring unit 10 to start of measurement. Of course, each measuring unit 10 can be started immediately by the local control switch 15.

In the operation by the measurement-data managing apparatus 30 for reserving measurement start, firstly, the measurement start time (time t2 shown in FIG. 4) and the measuring interval τ0 are in in step ST11. If required, in addition to the above items, it is possible to input the name, identification and other information for each measuring unit 10. In step ST12, communication with the measuring unit 10 starts using the communication portion 31. In step ST13, the measurement start command containing the interval τ0 is transmitted. The measurement start command contains the waiting period τ1 from the communication time measured by the RTC 34 to the measurement start time in addition to the data of measurement start time.

Figure 6:
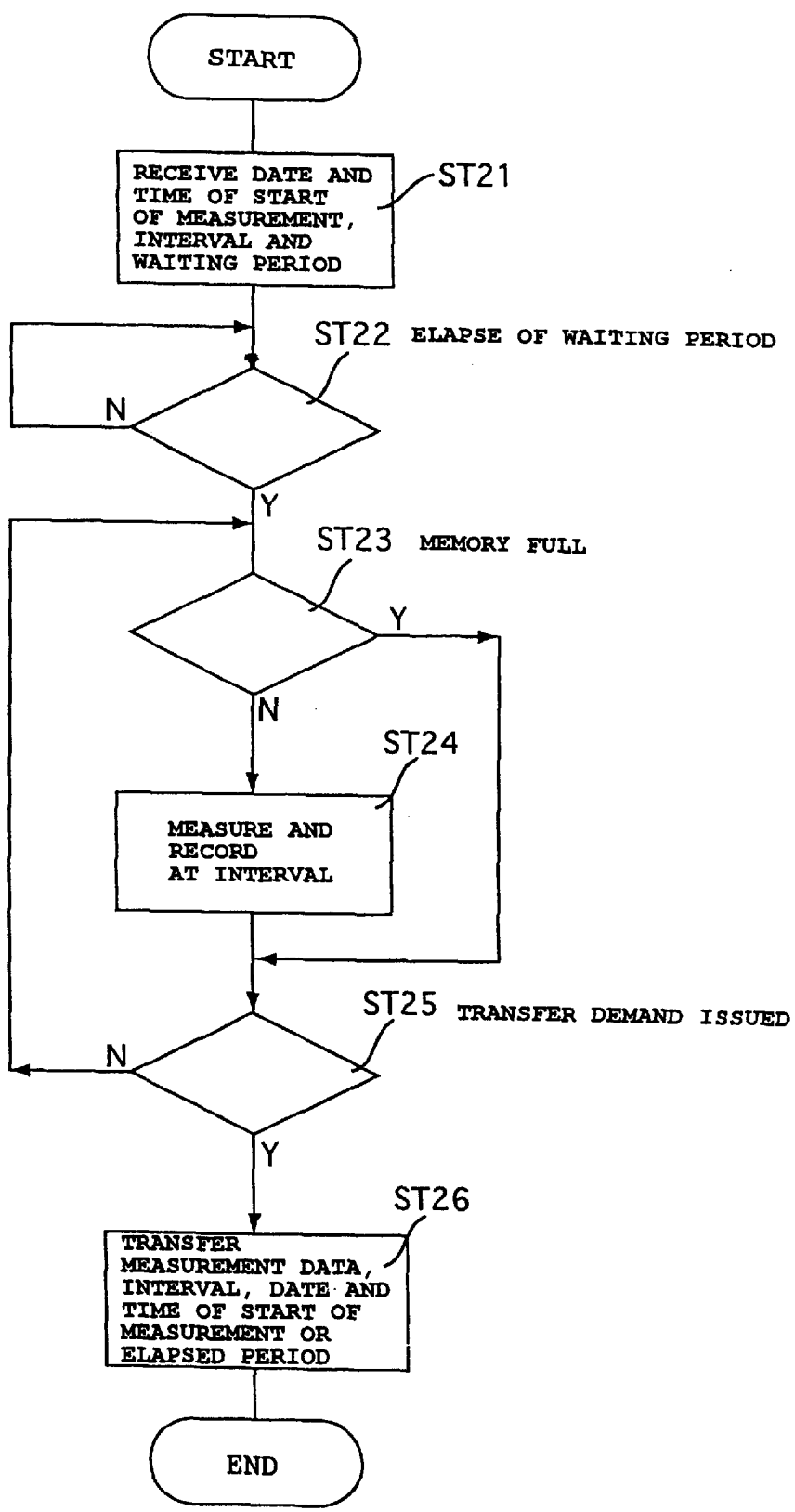
FIG. 6 is a flow chart of a process for measuring temperatures in a one-time mode.

As shown in FIG. 6, in the measuring unit 10, in step ST21 it receives the measurement start command containing information such as the measurement start time, the interval τ0 and the waiting period τ1 from the measurement-data managing apparatus 30 through the communication portion 23. Then, the process proceeds to step ST22. In step ST22, the control unit 25 causes the counter 24, which is capable of counting in a pitch such as second, to count the waiting period τ1. Namely, the measuring unit 10 is able to count the waiting period τ1 by the counter 24 after receiving the waiting period τ1. When the waiting period τ1 has elapsed, the measuring unit 10 judges that time has reached the measurement start time, thus starts the measurement. The start point of the waiting period τ1 may be any moment of time at which the communication has been started or subsequent timing at which both of the measurement-data managing apparatus 30 and the measuring unit 10 can synchronize with each other. Since the measuring unit 10 starts the measurement in accordance with the waiting period τ1, the measurement start time is not necessarily required to be transmitted to the measuring unit 10 as described above. However, when performing the measurement in the one time mode, the measurement start time may be important data as identification required when receiving measurement data. In the case where the elapsed period of time τ2 is not returned to the measurement-data managing apparatus 30 together with measurement data, data of the measurement start time is important because the measurement-data managing apparatus 30 may calculate the subsequent measurement time based on the measurement start time. Therefore, it is preferable to record the measurement start time in the measuring unit 10.

It is confirmed in step ST23 whether or not the memory 22 of the measuring unit 10 is filled with data. If the memory 22 has a vacant area, the process proceeds to step ST24 where measurement is performed at the interval τ0. Then, obtained measurement data are sequentially stored in the memory 22. In parallel with the measuring operation, or before or after the measuring operation, the transfer demand issued from the measurement-data managing apparatus 30 is confirmed in step ST25. If the transfer demand is confirmed in step ST25, the process proceeds to step ST26 where plural measurement data stored in the memory 22, the interval τ0, the measurement start time or the elapsed period τ2 are transferred. The process in step ST26 may be performed as an interrupting process to the control unit 25 in the form of CPU or the like upon issue of the transfer demand.

In step ST23, if the memory 22 is filled with data, the measurement in step ST24 is not performed. Even if the measurement is performed, measurement data item obtained in step ST24 is not recorded in the memory 22. Thus, the state of the memory 22 is maintained. If a transfer demand is issued, measurement data stored in the memory 22 is transferred to the measurement-data managing apparatus 30 together with the other information in the similar manner as the above transfer process.

Figure 7:
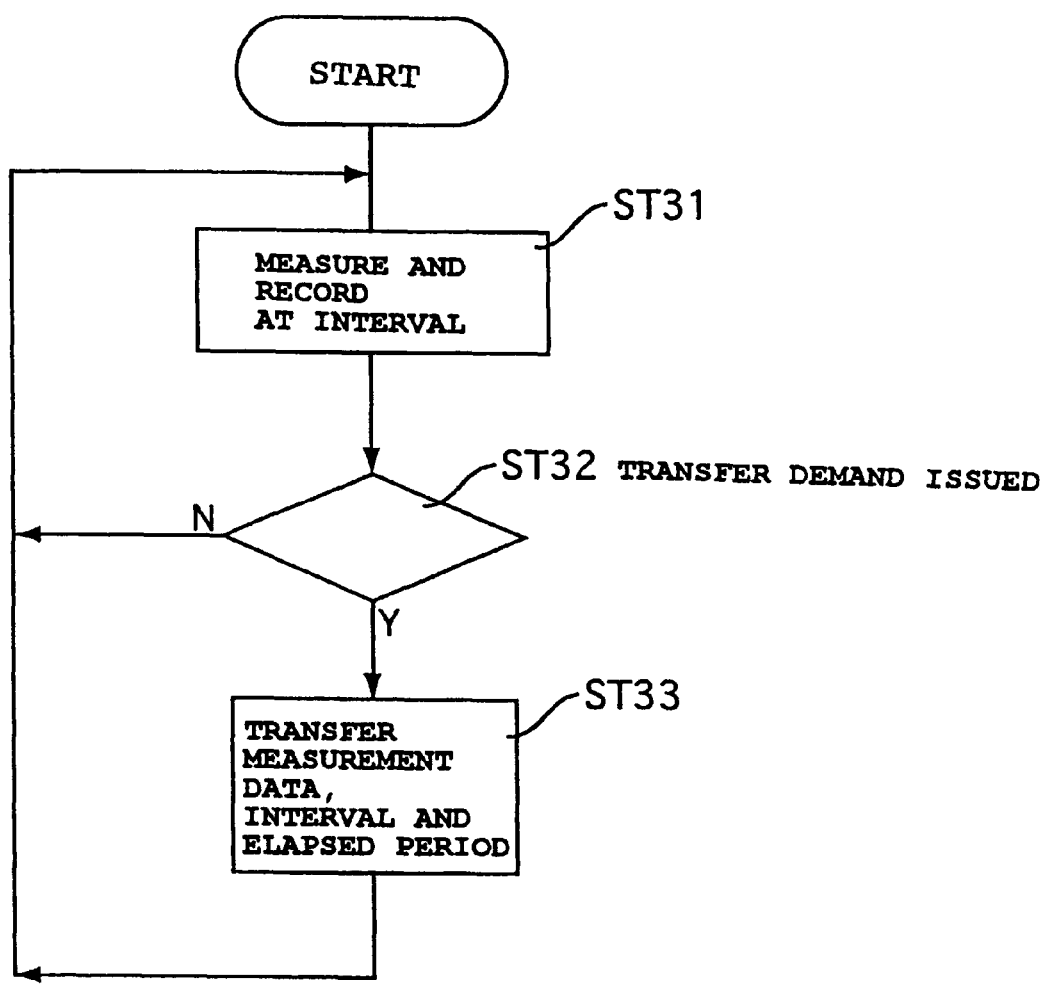
FIG. 7 is a flow chart of a process for measuring temperatures in an endless mode.

FIG. 7 shows a process of the measurement performed by the measuring unit 10 in the endless mode. In step ST31, measurement is performed at the interval τ0 communicated from the measurement-data managing apparatus 30 through the communication portion 23. Obtained measurement data in step ST31 are sequentially recorded in the memory 22. When a transfer demand is issued from the measurement-data managing apparatus 30 in step ST32 in the course of the measurement process, the process proceeds to step ST33. In step ST33, the plural measurement data stored in the memory 22 are transferred from the communication portion 23 to the measurement-data managing apparatus 30. The interval τ0 and the period τ2 elapsed from the last data measurement to the communication are further transmitted to the measurement-data managing apparatus 30. The timing (the communication time) at which the elapsed period τ2 is counted may be the moment when the communication is started or appropriate timing when both of the measurement-data managing apparatus 30 and the measuring unit 10 can synchronize with each other. The elapsed period τ2 is important information for transferring measurement data in the one time mode as well as in the endless mode. When the elapsed period τ2 is employed, the measurement time of each measurement data can be determined as described above. When the measurement is performed in the endless mode, there is possibility that long period of time has elapsed from the measurement start. In this case, there is apprehension that an error is further enlarged if each measurement time is obtained from the measurement start time. If the elapsed period τ2 is used, error-free measurement time or close thereto can be obtained in accordance with the time obtained by the clock function of the measurement-data managing apparatus 30.

Figure 8:
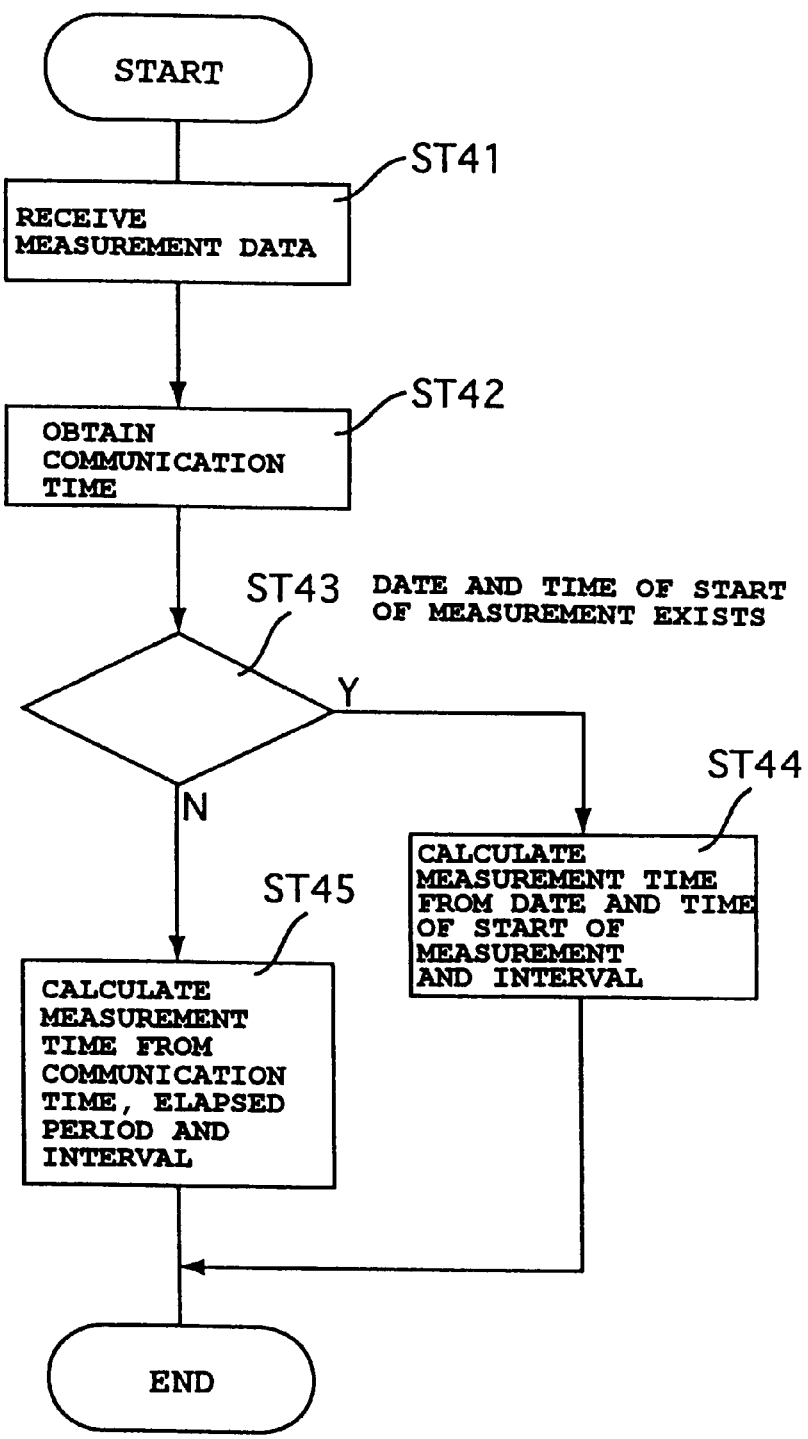
FIG. 8 is a flow chart of a process for obtaining measurement time by transferring measurement data.

FIG. 8 shows a process of the measurement-data managing apparatus 30 for receiving measurement data from the measuring unit 10 so as to obtain measurement time of each measurement data item. In step ST41, the communication portion 31 is operated to issue a transfer demand to each measuring unit 10 for communication. The measurement data recorded in the measuring unit 10 are received. In step ST42, the time communicated is obtained from the RTC 34. In step ST43, it is determined whether or not the measurement start time obtained from the measuring unit 10 exists or whether or not the measurement start time is valid. If the measurement start time has been communicated in the one time mode, the obtained measurement start time is set to be valid measurement start time. In this case, the measurement start time and the interval τ0 are used in step ST44 so as to obtain the measurement time of each measurement data.

In the endless mode, the measurement start time cannot be used because the measurement start time is not communicated or the obtained measurement start time is too much longer period of time to be used. Thus in step ST45, using the communication time (the time t15 shown in FIG. 4) and the elapsed period τ2 obtained, the time at which the last data has been measured is calculated. Then the other measurement time of each measurement data is further calculated using interval τ0.

The process shown in FIGS. 5 to 8 can be provided as a program that can be executed by the measuring unit or the personal computer serving as the measurement-data managing apparatus (the measuring data management apparatus). The process which must be performed by the measuring data management apparatus 30 may be formed into an application program for a personal computer which is recorded on the floppy disk drive 6 or recording media such as CD-ROM which can be read by the personal computer. Alternatively the application program may be provided through a computer network such as the Internet.

In the measuring system comprises the measuring units and the measuring data management apparatus 30 (which is realized by the personal computer) according to the present invention, the measuring unit is required to record only measurement data in the memory and to transfer the measurement data to the measuring data management apparatus except for predetermined data. The measuring data management apparatus can calculate measurement time of each measurement data. If the measuring data management apparatus instructs the measurement start time, the measurement can be started at the predetermined start time even when the measuring unit cannot measure the start time itself. Therefore, each measuring unit is not required to have the time counting function (the clock function) for supervising time. As a result, the structure of the measuring unit can be simplified.

Since the measuring unit is not required to record time information with respect to each measurement data, the capacity of the memory can fully be used to record measurement data. Thus, a measuring unit which is compact and has a great capacity for storing measurement data can be provided. The clock function is not required. In addition, time information of each measurement data is not required to transfer courses the communication time becomes shortened and the load applied to the communication process can be reduced. Thus, consumption of the battery can be minimized. Also electric power consumption during the process for counting and recording time can be prevented.

Therefore, a measuring unit exhibiting a long measurement lifetime and capable of continuously measuring and recording data for a long period of time can be provided. Since communication time with each measuring unit can be shortened, the measuring data management apparatus is able to communicate with a multiplicity of measuring units in a unit period time to obtain the measurement data.

Moreover, the measuring system according to the present invention enables that the measuring data management apparatus calculates all the measurement time of measurement data measured by each measuring unit. Therefore, data of a plurality of measuring units can collectively be managed based on the time counted by the precise clock function (the RTC unit) of the measuring data management apparatus. Hence, time deviation among the measuring units can be prevented and significantly reliable time information can be obtained for each measurement data. Therefore, a measuring system can be provided for application of a variety of purposes. For example, inside condition of a room or a warehouse can be controlled using the measurement data and time information. The process changing an environmental condition can be supervised and be analyzed using the measured data and calculated time thereof. In addition, the measurement start command containing the waiting period can also be transmitted and received, the reservation function can be added. Therefore further convenient measuring system can be provided.

Moreover, a complicated process for synchronizing the time among the respective measuring units can be omitted. If a large number of measuring units are provided, the time-synchronizing operation among the measuring units cannot be manually performed. In this case, the measuring data management apparatus 30 is expect to perform the time-synchronization by communication. When the measuring unit of this embodiment is employed, the foregoing process and electric power required to perform the communication can be omitted.

Although this embodiment has been described about the system for measuring temperatures, the present invention may, of course, be applied to a measuring system for measuring the other physical quantity, such as humidity, vibrations and noise. Measurement time of these measurement data items can precisely be obtained so as to be used to display and analyze the measurement data.

What is claimed is:

1. A measuring unit comprising:
    measuring means capable of sequentially recording plural measurement data measured at a predetermined interval of period of time in a recording means; and
    communication means capable of transferring the plural measurement data recorded in said recording means and transferring a period elapsed from last data measurement to a time of transferring the plural measurement data, together with said plural measurement data.

2. A measuring unit according to claim 1, wherein
    said communication means is able to receive a measurement start command containing a waiting period elapsing from receipt of the measurement start command to measurement start, and
    further comprises control means for starting measurement after the elapse of the waiting period contained in said measurement start command upon receipt thereof.

3. A measuring data management apparatus comprising:
    communication means capable of performing communication with said measuring unit claimed in claim 1 and receiving the period elapsed from the last data measurement together with the plural measurement data;
    time measuring means for obtaining communication time; and
    means for obtaining measurement time of each of received measurement data in accordance with the communicated time, the elapsed period and the measurement interval.

4. A measuring data management apparatus according to claim 3, wherein said communication means is able to obtain, from said time measuring means, time at which a measurement start command is transmitted and transmit said measurement start command containing waiting period elapsing from the transmission to the measurement start.

5. A measuring method comprising:
    sequentially recording plural measurement data measured at a predetermined interval of period of time; and
    transferring the recorded plural measurement data and period elapsed from last data measurement to a time of transferring the recorded plural measurement data.

6. A measuring method according to claim 5, further comprising:
    receiving a measurement start command containing waiting period elapsing from receipt of the measurement start command to measurement start prior to said recording step; and
    starting measurement after the elapse of the waiting period contained in said measurement start command upon receipt thereof.

7. A measuring data management method comprising:
    performing communication with a measuring unit capable of sequentially recording plural measurement data measured at a predetermined interval of period of time and receiving the plural measurement data and period elapsed from last data measurement to communication;
    obtaining communication time; and
    obtaining measurement time of each of the received measurement data in accordance with the communication time, the elapsed period and the measurement interval.

8. A measuring data management method according to claim 7, further comprising:
    transmitting a measurement start command containing waiting period elapsing from transmission to measurement start when transmitting the measurement start command for communication with said measuring unit.

9. A recording medium having a measuring data management program recorded therein, wherein
    said measuring data management program includes commands for executing:
        a receiving process for performing communication with a measuring unit capable of sequentially recording plural measurement data measured at a predetermined interval of period of time and receiving the plural measurement data and period elapsed from last data measurement to communication,
        a time measuring process for obtaining communication time; and
        a process for obtaining measurement time of each of the received measurement data in accordance with the communication time, the elapsed period and the measurement interval.

10. A recording medium having a measuring data management program recorded therein according to claim 9, wherein said measuring data management program further includes a command for executing a transmission process for transmitting a measurement start command containing waiting period elapsing from transmission to measurement start when transmitting the measurement start command for communication with said measuring unit.

* * * * *